United States Patent
O'Connell

(10) Patent No.: US 10,412,935 B2
(45) Date of Patent: Sep. 17, 2019

(54) MULTIFUNCTION LIVESTOCK MEASUREMENT STATION

(71) Applicant: Illinois Tool Works Inc., Glenview, IL (US)

(72) Inventor: John P. O'Connell, Suzhon (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/754,701

(22) PCT Filed: Aug. 4, 2016

(86) PCT No.: PCT/US2016/045629
§ 371 (c)(1),
(2) Date: Feb. 23, 2018

(87) PCT Pub. No.: WO2017/034776
PCT Pub. Date: Mar. 2, 2017

(65) Prior Publication Data
US 2018/0242558 A1    Aug. 30, 2018

Related U.S. Application Data

(60) Provisional application No. 62/209,030, filed on Aug. 24, 2015.

(51) Int. Cl.
| *G01N 21/00* | (2006.01) |
| *A01K 29/00* | (2006.01) |
| *G01G 17/04* | (2006.01) |
| *G01G 23/00* | (2006.01) |
| *G01B 11/03* | (2006.01) |
| *G01G 17/08* | (2006.01) |
| *G01K 13/00* | (2006.01) |

(52) U.S. Cl.
CPC ............ *A01K 29/005* (2013.01); *A01K 29/00* (2013.01); *G01B 11/03* (2013.01); *G01G 17/04* (2013.01); *G01G 17/08* (2013.01); *G01G 23/00* (2013.01); *G01G 23/005* (2013.01); *G01K 13/002* (2013.01)

(58) Field of Classification Search
CPC ...... A01K 29/00; A01K 67/027; G01G 23/00; G01G 17/08; G01G 9/00; G01B 11/03; G01K 13/00; G06G 7/60; G01C 3/08; G06K 9/00
See application file for complete search history.

(56) References Cited

U.S. PATENT DOCUMENTS

| 4,745,472 A | 5/1988 | Hayes |
| 5,576,949 A | 11/1996 | Scofield et al. |
| 2004/0023612 A1* | 2/2004 | Kriesel ............... A01K 11/008 452/157 |
| 2004/0032974 A1 | 2/2004 | Kriesel |
| 2005/0136819 A1 | 6/2005 | Kriesel |

(Continued)

*Primary Examiner* — Abdullahi Nur
(74) *Attorney, Agent, or Firm* — Boyle Fredrickson, S.C.

(57) ABSTRACT

A multifunction livestock measurement system provides automatic hip location for animal height (hip height) assessment using a side-looking optical system. An automatic implementation identifies the hip through an analysis of the underside of the hindquarters of the animal. A manual version identifies the hip manually in a similar image. Automatic ear tag reading, weight measurement and animal temperature measurement can be integrated into the station.

8 Claims, 4 Drawing Sheets

(56) References Cited

U.S. PATENT DOCUMENTS

2005/0257748 A1* 11/2005 Kriesel ................ A01K 11/008
   119/51.02
2008/0273760 A1* 11/2008 Metcalfe ................ A01K 29/00
   382/110
2009/0154910 A1   6/2009 Weinberg et al.

* cited by examiner

MULTIFUNCTION LIVESTOCK MEASUREMENT STATION

CROSS REFERENCE TO RELATED APPLICATIONS

This application claims the benefit of U.S. provisional application 62/209,030 filed Aug. 24, 2015, and hereby incorporated in its entirety by reference.

FIELD OF THE INVENTION

The present invention relates to stations for measuring livestock and in particular to a multifunction station that can provide for multiple livestock measurements including hip height, weight, and temperature.

BACKGROUND OF THE INVENTION

The successful management of livestock requires careful control of the cost of livestock feed. This, in turn, requires an understanding of the changing development and health of the livestock being fed. Of particular interest is monitoring the trend in livestock weight and height gain; however, other measurements such as temperature are also important. Current methods of making these measurements on multiple animals are time-consuming and/or require complex or expensive equipment.

SUMMARY OF THE INVENTION

The present invention provides a multifunction livestock measurement station that can measure livestock weight, size, temperature, and the like at a single location. A side-looking optical system provides consistent height measurement using multiple measured data points to permit more consistent identification of hip location.

More specifically, the invention provides a livestock measurement system having a stall providing a platform surrounded by guide elements for positioning a standing animal on the platform at a predetermined location with respect to the platform. A light sensor captures an areal measurement of a hindquarters of the animal at the predetermined location on the platform, the aerial measurement being substantially within a vertical plane aligned with a superior/inferior axis 17 of the animal at the predetermined location, to reveal a height from the platform of the hindquarters at multiple points displaced along the axis and at the uppermost position of the hindquarters. An electronic computer receives signals from the light sensor to identify, from the multiple points, a hip location and make a height measurement of the hindquarters at the hip location within the areal measurement and recording the same for output.

It is thus a feature of at least one embodiment of the invention to provide a simplified method of hip height measurement employing side-looking optical systems allowing a compact multifunction measurement station to be produced. It is another feature of at least one embodiment of the invention to provide improved consistency in hip height measurement with variations in animal location by using the optical system to also identify hip location as well as height to distinguish among multiple possible height measurements.

The light sensor may provide opposed, two-dimensional arrays of light receivers and light transmitters sequentially exercised to make multiple substantially horizontal measurements within the vertical plane, and the electronic computer may identify, using the horizontal measurements, light receivers at an upper boundary representing the uppermost position of the hindquarters within the vertical plane and extracts the hip height from heights of the light receivers at the upper boundary.

It is thus a feature of at least one embodiment of the invention to make optical measurements using substantially horizontal beams eliminating perspective effects.

The electronic computer may further identify light receivers at a lower boundary representing a lowermost position of the hindquarters within the vertical plane and extract hip height from the heights of the receivers at the upper boundary based on an analysis of the light receivers at the lower boundary.

It is thus a feature of at least one embodiment of the invention to improve consistent identification of hip location through the analysis of the under surface of the animal's hindquarters.

The electronic computer may extract hip height from a height of the receiver of the upper boundary along a vertical line aligned with a lowermost light receiver at the lower boundary.

It is thus a feature of at least one embodiment of the invention to provide a simple method of identifying the animal's leg and thus accurately locating the hip.

In an alternative embodiment, the light sensor may be an electronic camera positioned to capture an image of the vertical plane, and the electronic computer may identify a height of a predetermined pixel within the captured image as the hip height.

It is thus a feature of at least one embodiment of the invention to provide a system that permits manual simultaneous identification of hip location and height through a user aligning a predetermined pixel location at the top of the animal's hip.

The camera maybe manually positionable in angle about a horizontal axis by a user and further provides an output to the electronic computer of an angle of the camera about the horizontal axis. The electronic computer may further extract the hip height by determining a height of a portion of the animal represented by the pixel based on the angle of the camera.

It is thus a feature of at least one embodiment of the invention to provide a simple user interface that allows measurement of hip height by adjusting camera angle without the need to contact a touchscreen or the like such as may be susceptible to environmental contamination interfering with its operation.

The camera may include an angle sensor and the angle of the camera may be determined by using the angle sensor to determine a vector indicating an orientation of the acceleration of gravity.

It is thus a feature of at least one embodiment of the invention to provide a system that can use common smart devices having accelerometers, flux sensors and the like without the need to instrument a separate camera support.

The camera may provide a display outputting the image and a cursor positioned over the predetermined pixel so that the predetermined pixel may be manually aligned with a hip of the animal in the image.

It is thus a feature of at least one embodiment of the invention to provide a local display for the operator simplifying manipulation of the camera.

The livestock measurement system may further include a tag reader for reading a tag on the animal and providing a tag identification number to the computer. The computer may store the hip height measurement in a database linked to the tag identification number.

It is thus a feature of at least one embodiment of the invention to provide a system for creating a comprehensive record of each animal indexed to a unique animal identification number.

In addition or alternatively, the livestock measurement system may provide a remote temperature monitor for monitoring a temperature of the animal in the predetermined position and the remote temperature monitor communicates so that the computer may store the temperature of the animal linked to the tag identification number.

It is thus a feature of at least one embodiment of the invention to link hip height with animal temperature to detect possible ailments.

The remote temperature monitor may provide a two-dimensional thermal image of the animal's face at the predetermined position and may select from the thermal image portions a peak temperature. This peak temperature may be from an area of a nose and mouth as the temperature of the animal.

It is thus a feature of at least one embodiment of the invention to provide a simple noncontact method of assessing animal temperature to assess health.

In addition or alternatively, the livestock measurement system may provide an electronic scale supporting the platform and providing a weight of the animal at the predetermined location to the electronic computer. The electronic computer may store the weight of the animal linked to the tag identification number.

It is thus a feature of at least one embodiment of the invention to link hip height to animal weight for more complete assessment of the animal.

In one embodiment, the light sensor may be a scannable light receiver movable in two dimensions to make multiple substantially horizontal measurements within the vertical plane to create the areal measurement within the vertical plane, and the electronic computer may identify measurements at an upper boundary representing the uppermost position of the hindquarters within the vertical plane and extract the hip height.

It is thus a feature of at least one embodiment of the invention to provide an alternative to a multiple element light receiver for providing substantially horizontal and perspective-free measurements of the animal.

Other features and advantages of the invention will become apparent to those skilled in the art upon review of the following detailed description, claims and drawings in which like numerals are used to designate like features.

Figure 1:
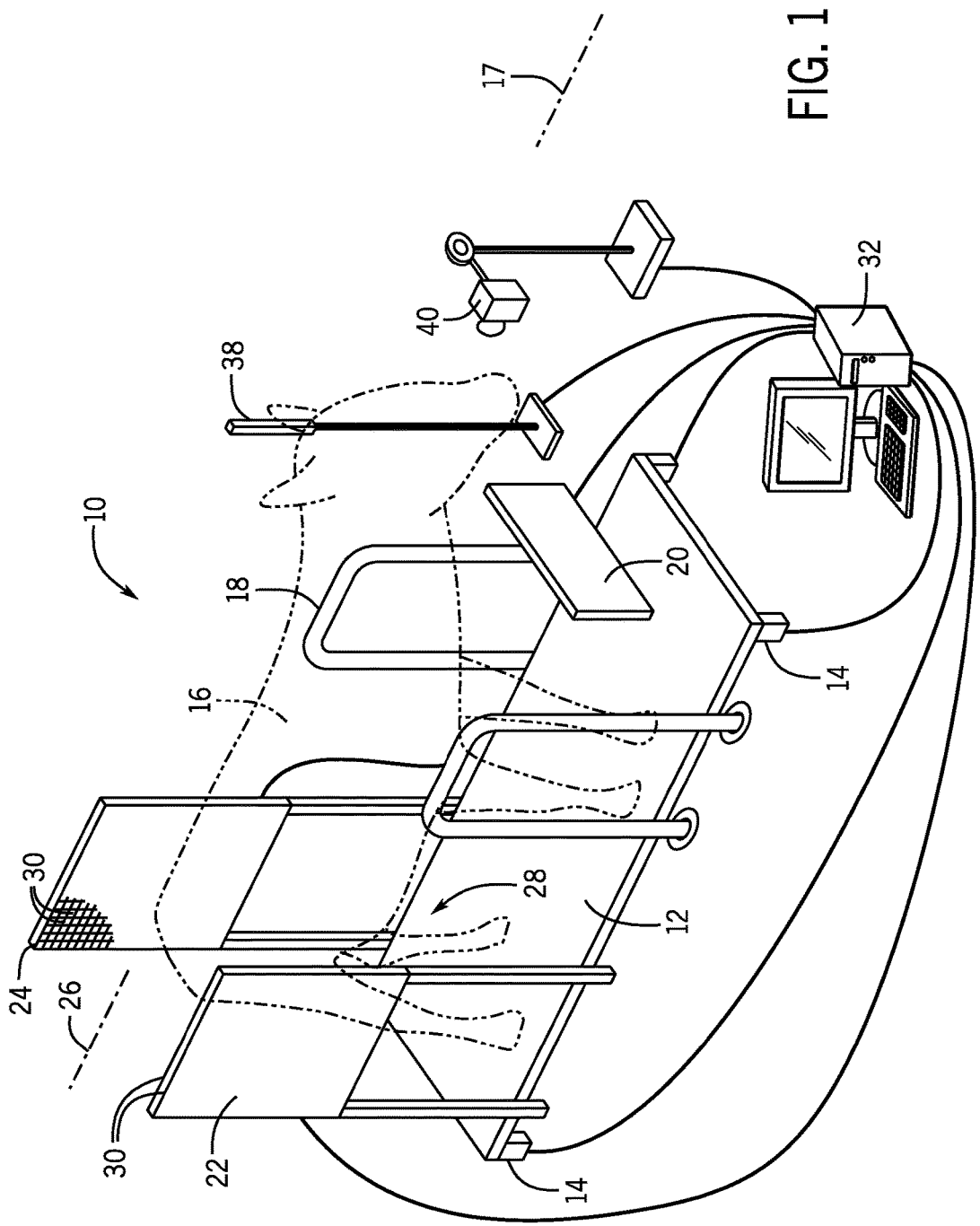
FIG. 1 is a perspective view of a multifunction livestock measurement station according to the present invention for receiving livestock (shown in phantom) to provide ear tag readings and weight, height, and temperature measurements of livestock, and showing an opposed two-dimensional photodetector/LED array for height measurement in a first embodiment.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to FIG. 1, a multifunction livestock measurement station 10 may include a planar horizontal weighing platform 12, for example, supported on load cells 14 to provide a weighing of a stationary animal 16 on the platform 12. The weighing platform 12 maybe sized generally to hold a single animal 16. The animal 16 may be retained on the platform by means of guide rails 18 to the left and right of the platform and a removable stop plate 20 to the front of the animal, positioning the animal at a predetermined location along a path of ingress and egress aligned with the superior/inferior axis 17 of the animal 16.

Figure 4:
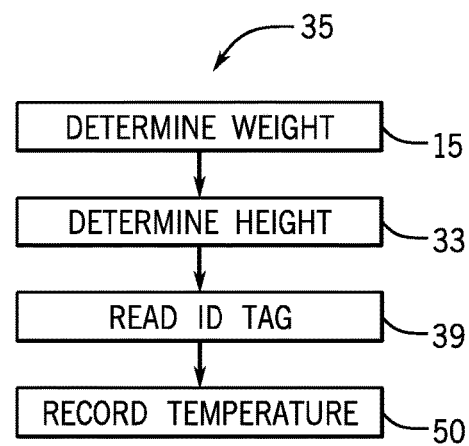
FIG. 4 is a flowchart describing the steps of making multiple measurements of livestock using the present invention.

The load cells 14 may communicate with a computer system 32 executing a stored program 35 (shown in FIG. 4) to provide a measurement of the resting weight of the animal 16 as part of a first measurement indicated by process block 15 of FIG. 4. The computer system 32 may be, for example, a standard desktop-type personal computer, tablet, smart phone, or other computing system having comparable functionality.

At the rear of the platform 12, positioned on either side of the platform 12 near the hindquarters of the animal 16 are a vertically extending light emitter panel 22 and vertically extending light receiver panel 24, the latter parallel to the light emitter panel 22 but separated therefrom so that the light receiver panel 24 and light emitter panel 22 flank the animal 16 along an axis centered on and normal to each of the light receiver panel 24 and light emitter panel 22 and generally perpendicular to the animal's superior/inferior axis 17. Light emitted by the light emitter panel 22 and received by the light receiver panel 24 passes through a volume that is positioned to extend slightly higher than expected hip height 26 of the animal 16 and slightly below the groin 28 of the animal 16.

Each of the light emitter panel 22 and light receiver panel 24 provide a set of measurement cells 30 arranged in rows and columns, for example, on a five millimeter spacing vertically and horizontally. Within each cell 30 on the light emitter panel 22, on a side facing the light receiver panel 24, is a separately addressable light emitting diode providing either visible or infrared light. The light emitting diode may be activated under control of the computer system 32 and modulated to project light toward the light receiver panel 24. Correspondingly, the surface of the light receiver panel 24, facing the light emitter panel 22, provides in each cell 30 separately addressable light sensors such as discrete photo transistors or photodiodes that may receive light from the illuminated LED on the light emitter panel 22 and demodulate the same (to distinguish between the light of the light emitter panel 22 and ambient light) and thereby to detect whether a substantially horizontal line passing between corresponding cells 30 of the light emitter panel 22 and light receiver panel 24 is occluded by the animal 16. In one embodiment, corresponding cells of the light emitter panel 22 and light receiver panel are activated one at a time to make a series of substantially horizontal measurements scanned over two dimensions defined by the areas of the light emitter panel 22 and light receiver panel 24.

Figure 2:
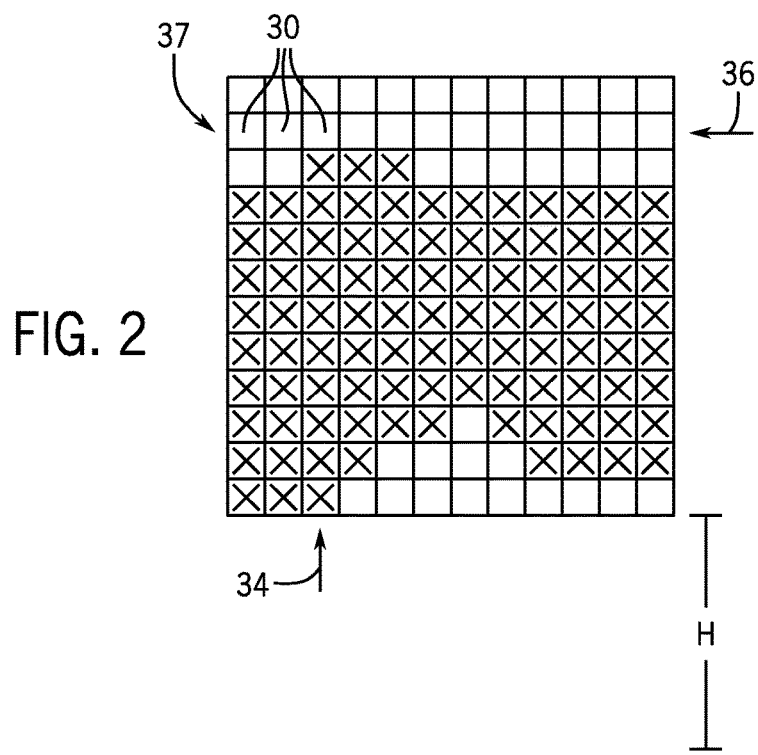
FIG. 2 is a simplified schematic representation of the data received from a two-dimensional photodetector/LED array used for identifying hip location through analysis of the lower hindquarters and measurement of hip height at the hip location on the upper hindquarters.

Referring now to FIG. 2, signals from the light sensors of the light receiver panel 24 are provided to the computer system 32 to develop an array 37 of data. In this regard, it will be understood that each cell 30 may thus cooperate to provide a signal indicating whether light between corresponding cells 30 has been transmitted or blocked along a line extending horizontally between corresponding cells. The array 37 provides an image of a shadow of the animal that can be measured for animal height.

As noted, in one method for making this measurement, the cells 30 are scanned by the electronic computer system 32 in pairwise fashion (so as to eliminate crosstalk) to activate individual LEDs and photodetectors and corresponding cells 30 (that is cells having equal height and horizontal offset). The array 37 provides data values, each having positions corresponding to the positions of the cells 30 depicted in FIG. 2 and values equal to the amount of light passing between the light emitter panel 22 and light receiver panel 24. The values may be compared to a threshold to provide binary values indicating blockage or no blockage of the corresponding light beam. Each cell 30 may be associated with a height value above the platform 12 by a calibration step performed, for example, during manufacture of the device.

The array is then scanned by the computer system 32 to determine a column 34 of cells 30 in the array 37 (corresponding to the cells in the light receiver panel 24) in the furthest rearmost direction on the animal that provides a lowest point of occlusion of the light beams between the light emitter panel 22 and light receiver panel 24 for that element. In the event of multiple cells 30 having equally low positions of occlusion, the frontmost cell 30 will be chosen.

Using that identified column 34, the highest row of occlusion 36 is next determined and this row is considered to measure the hip height 26 of the animal. That is, the hip height 26 is the height of the animal 16 directly above the groin 28. The actual height may be determined by counting the number of rows from the bottom of the array 37 to the highest role of occlusion 36 and multiplying this number by the pitch of the cells 30 (five millimeters in this example) and adding to that a value H being the height of the light emitter panel 22 and light receiver panel 24 above the upper surface of the platform 12. This information may also be transmitted to the computer system 32 as indicated by process block 33 of FIG. 4 and recorded as animal height.

The computer system 32 may also receive information from a tag reader 38 such as may provide for interrogation of an RFID tag on the animal 16 uniquely identifying the animal 16 as shown by process block 39 of FIG. 4. This identification may be used to populate a database linking the animal (identified by the tag reader 38), a time and date of a measurement of the animal using the present invention (determined by an internal clock on the computer system 32), the animal weight, and the hip height as described above.

Figure 3:
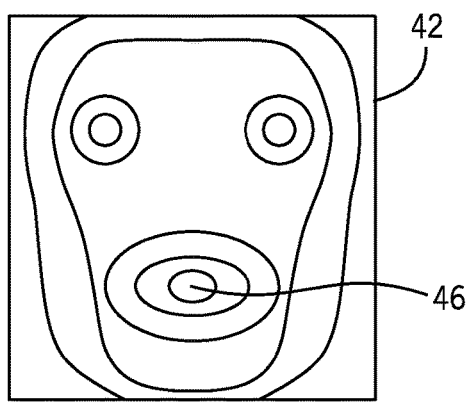
FIG. 3 is a simplified representation of a thermographic image obtained by the present invention for remote measurement of mouth temperature of the livestock.

Referring now also to FIG. 3, the computer system 32 may also be connected to an optical pyrometer camera 40 that may be directed at the face of the animal 16 as held stationary on the platform 12 to provide a thermographic image 42 of the animal's face. This thermographic image may be communicated to the computer system 32 which may analyze the image 42 to find a peak temperature 46 which will be associated with the animal's nose and mouth. This peak temperature may be converted to an animal core temperature by a conversion factor developed empirically and may be recorded by the computer system 32 in the database associated with the animal as identified by the tag reader above as indicated by process block 50.

Figure 5:
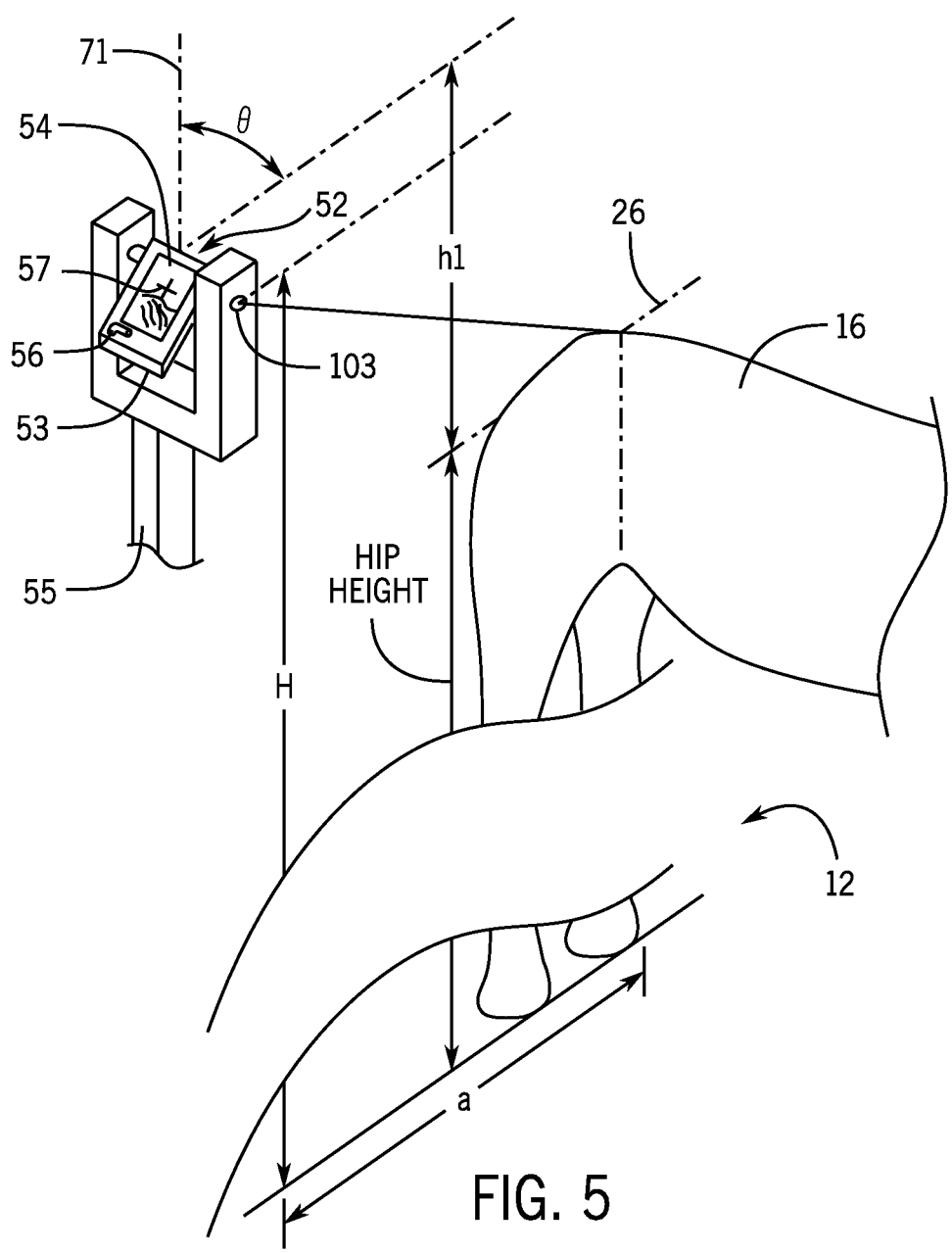
FIG. 5 is a fragmentary, front elevational view of an alternative embodiment of the station of FIG. 1 showing the use of a smart device-based height detection system.

Referring now to FIG. 5, in an alternative height measurement technique, an electronic camera 52, such as a tablet or smart phone, may be placed to the side of the animal 16 proximate to its hindquarters. The electronic camera 52 may be held in a pivoting cradle 53 supported on a pillar 55 and positioned at a fixed distance a from a center line of the animal 16 as located on the platform 12 so that the lens of the camera 52 may image the hindquarters of the animal 16 in a generally sideward direction comparable to that provided by the light emitter panel 22 and light receiver panel 24.

The pivoting cradle 53 may be adjusted in angle about a horizontal pivot axis 103, for example, using a handle 56 attached to the cradle 53 to minimize dirt transferred to the electronic camera 52. This angle adjustment is controlled by the user so that a display 54 of the electronic camera 52 displays an image of the hindquarters of the animal with the top of the hip of the animal aligned with a crosshairs 57 shown on the display 54 at a fixed location, for example, the center of the display 54. The user may accommodate a slight horizontal misalignment between the hip and the crosshairs 57 or the pivoting cradle 53 may also be provided with the ability to pivot about a vertical axis 61 so that the crosshairs 57 may be aligned directly on the hip both in a vertical and horizontal position. A friction clutch (not shown) may hold the pivoting cradle 53 at its last adjusted position. Preferably, for this purpose, the horizontal pivot axis 103 of the cradle 53 may be aligned with the camera lens of electronic camera 52.

Once this visual alignment has been attained (for example, as indicated by pressing a button on the camera 52 or connected to the camera 52 by a remote connection such as a wireless connection), the angle θ of the camera 52 from vertical may be determined by an internal accelerometer in the camera 52 that acts like a tilt gauge or by using a corresponding gauge system in the cradle 53 communicating with the camera. As is understood in the art this angle may be determined by a three-axis accelerometer used to develop a three-dimensional vector aligned with gravitational acceleration (downward). Alternative methods of angle measurement are also contemplated by the invention including for example magnetic flux sensors, mechanical inclinometers and the like.

Figure 6:
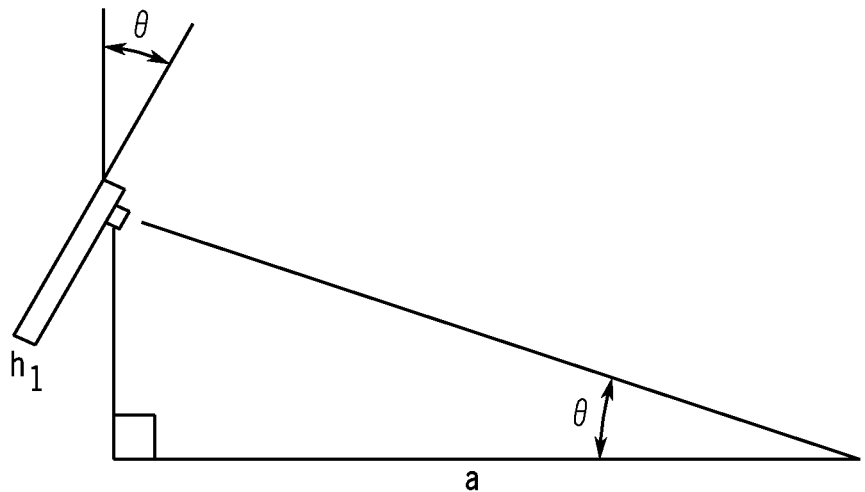
FIG. 6 is a geometric diagram showing calculation of height using the embodiment of FIG. 5.

Referring now also to FIG. 6, it will be appreciated that knowing the angle θ and the distance describing the horizontal separation between the camera lens and a center of the platform 12 on which the animal 16 is positioned (which may be fixed by the construction of the measurement station 10 and the location and height of the pillar 55) permits a trigonometric determination of a height h1 being a displacement vertically of the camera lens from the hip height 26 according to the formula:

$$h1 = a * \tan(\theta) \qquad (1)$$

Hip height 26 may then be determined by subtracting h1 from the height H of the camera lens, the latter H being substantially a constant value that may be measured based on the height of the pillar 55.

It will be appreciated that this trigonometric calculation may be performed entirely within the camera 52 when the camera 52 is a smart phone or tablet or the like and the height information displayed directly on the display of the camera 52 or communicated, for example, by wireless or Bluetooth link, to the stationary computer system 32 for enrollment in a database. Alternatively, the angle information may be sent to the computer system 32 to perform this calculation. Alternatively, each of the signals from the load cells 14, the tag reader 38, and the optical pyrometer camera 40 may be sent to the camera 52 (for example, by Bluetooth or other wireless connection) which may replace the computer system 32 entirely in its above-described functions. Generally references to a computer in the claims should be understood to be any or combination of various interlinked computer systems.

In some embodiments the camera 52 may automatically place the cursor at an appropriate location on the display 54 using image recognition techniques and the angle θ modified appropriately based on an offset of the located cursor from a center of the display. This image recognition technique may be similar to that described above with respect to FIG. 2 treating each of the pixels of the image like a cell 30.

Figure 7:
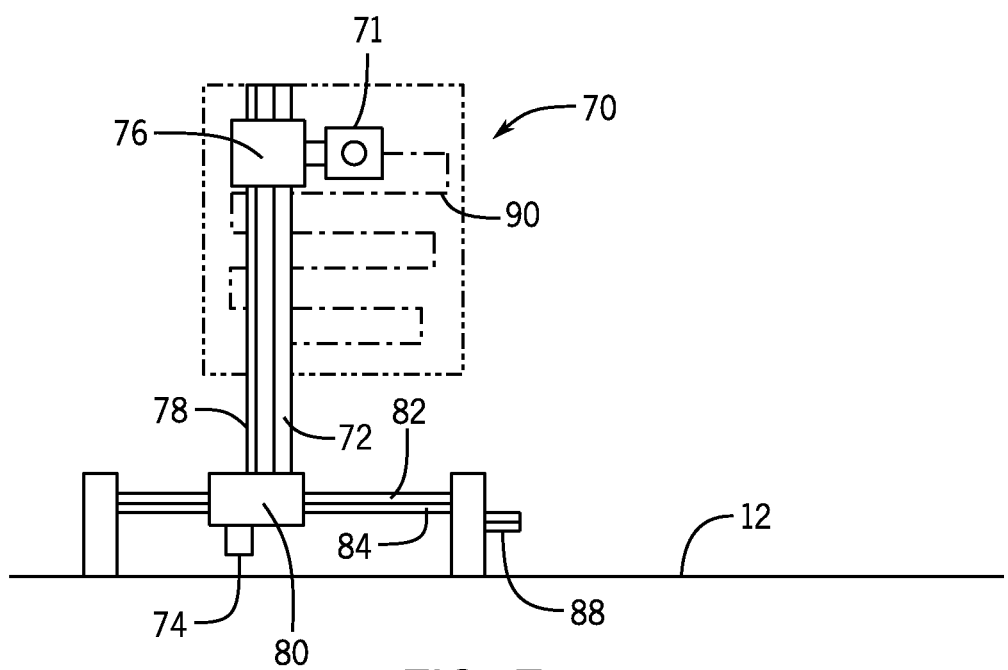
FIG. 7 is a side elevational view of an alternative side-looking optical system to obtain the data of FIG. 2 using a single mechanically scanned photo receiver.

Referring now to FIG. 7, it will be appreciated that the function of the light emitter panel 22 and light receiver panel 24 may be duplicated by a sequential scanning process in which an x-y scanning camera system 70 scans sequentially over the area occupied by the light receiver panel 24. In one example, the scanning camera system 70 may provide for a single light detector 71 focused on an illuminated panel or light background positioned at the location of the light emitter panel 22 with the camera positioned to scan through the area occupied by the light receiver panel 24. The light detector 71 may be mounted on a vertical support 72 to be adjusted vertically, for example, by a stepper or servomotor 74 communicating with a carriage 76 holding the light detector 71 by means of a lead screw 78 and with respect to a second carriage 80. The second carriage 80 may be in turn mounted on a horizontal track 82 to move left and right by a lead screw 84 driven by a stepper motor 88 or similar device. Motors 88 and 74 may communicate with the computer system 32 to allow the light detector 71 to be scanned in a raster pattern 90 over the area occupied by the light receiver panel 24 to generate a similar array 37 as shown in FIG. 2 albeit sequentially rather than in parallel. Alternatively, a two-dimensional light detector may be scanned along one of the x and y axes.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A livestock measurement system comprising:
a stall providing a platform surrounded by guide elements for positioning a standing animal on the platform at a predetermined location with respect to the platform;
a light sensor for capturing an areal measurement of a hindquarters of the animal at the predetermined location on the platform, the aerial measurement being substantially within a vertical plane aligned with a superior/inferior axis of the animal at the predetermined location to reveal a height from the platform of the hindquarters at multiple points displaced along the axis and at the uppermost position of the hindquarters;
an electronic computer receiving signals from the light sensor to identify, from the multiple points, a hip location and make a height measurement of the hindquarters at the hip location of the hindquarters within the areal measurement and recording the height measurement for output;
wherein the light sensor comprises an electronic camera positioned to capture an image of the vertical plane;
wherein the electronic computer identifies a height of a predetermined pixel within the captured image as the hip height;
wherein the camera is manually positionable in angle about a horizontal axis by a user and further provides an output to the electronic computer of an angle of the camera about the horizontal axis;
wherein the electronic computer further extracts the hip height by determining a height of a portion of the animal represented by the pixel based on the angle of the camera;
wherein the camera includes an accelerometer and wherein the angle of the camera is determined by using the accelerometer to determine a vector indicating an orientation of an acceleration of gravity; and
wherein the camera provides a display outputting the image and a cursor positioned over the predetermined pixel so that the predetermined pixel may be manually aligned with a hip of the animal in the image.

2. The livestock measurement system of claim 1 further including a tag reader for reading a tag on the animal and providing a tag identification number to the computer and wherein the computer stores the hip height measurement in a database linked to the tag identification number.

3. The livestock measurement system of claim 2 further including a remote temperature monitor for monitoring a temperature of the animal in the predetermined position; and
wherein the remote temperature monitor communicates with the computer; and
wherein the computer stores the temperature of the animal linked to the tag identification number.

4. The livestock measurement system of claim 3 wherein the remote temperature monitor provides a two-dimensional thermal image of the animal's face at the predetermined position and selects from the thermal image a peak temperature.

5. The livestock measurement system of claim 2 wherein the platform provides an electronic scale supporting the platform and providing a weight of the animal at the predetermined location to the electronic computer and wherein the electronic computer stores the weight of the animal linked to the tag identification number.

6. A livestock measurement system comprising:
a stall providing a platform surrounded by guide elements for positioning a standing animal on the platform at a predetermined location with respect to the platform;
a light sensor for capturing an areal measurement of a hindquarters of the animal at the predetermined location on the platform, the aerial measurement being substantially within a vertical plane aligned with a superior/inferior axis of the animal at the predetermined location to reveal a height from the platform of the hindquarters at multiple points displaced along the axis and at the uppermost position of the hindquarters;
an electronic computer receiving signals from the light sensor to identify, from the multiple points, a hip location and make a height measurement of the hindquarters at the hip location of the hindquarters within the areal measurement and recording the height measurement for output;
a tag reader for reading a tag on the animal and providing a tag identification number to the computer and wherein the computer stores the hip height measurement in a database linked to the tag identification number; and
a remote temperature monitor for monitoring a temperature of the animal in the predetermined position; and
wherein the remote temperature monitor communicates with the computer;
wherein the computer stores the temperature of the animal linked to the tag identification number;
wherein the remote temperature monitor provides a two-dimensional thermal image of the animal's face at the predetermined position and selects from the thermal image a peak temperature; and
wherein the temperature of the animal selects a temperature from an area of a nose and mouth area as the temperature of the animal.

7. A livestock measurement system comprising:
a stall providing a platform surrounded by guide elements for positioning a standing animal on the platform at a predetermined location with respect to the platform;
a light sensor for capturing an areal measurement of a hindquarters of the animal at the predetermined location on the platform, the aerial measurement being substantially within a vertical plane aligned with a superior/inferior axis of the animal at the predetermined location to reveal a height from the platform of the hindquarters at multiple points displaced along the axis and at the uppermost position of the hindquarters; and
an electronic computer receiving signals from the light sensor to identify, from the multiple points, a hip location and make a height measurement of the hindquarters at the hip location of the hindquarters within the areal measurement and recording the height measurement for output; and
wherein the light sensor comprises a scanning light receiver movable in two dimensions to make multiple substantially horizontal measurements to create the areal measurement within the vertical plane and wherein the electronic computer identifies measurements at an upper boundary representing the uppermost position of the hindquarters within the vertical plane and extracts the hip height.

8. The livestock measurement system of claim 7 wherein the electronic computer further identifies measurements at a lower boundary representing a lowermost position of the hindquarters within the vertical plane and extracts hip height from the measurements at the upper boundary based on an analysis of the measurements at the lower boundary.

* * * * *